United States Patent
Chong

(10) Patent No.: US 7,447,205 B2
(45) Date of Patent: Nov. 4, 2008

(54) SYSTEMS AND METHODS TO INSERT BROADCAST TRANSACTIONS INTO A FAST DATA STREAM OF TRANSACTIONS

(75) Inventor: Huai-Ter Victor Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/435,639

(22) Filed: May 9, 2003

(65) Prior Publication Data

US 2004/0223492 A1    Nov. 11, 2004

(51) Int. Cl.
H04L 12/56    (2006.01)
(52) U.S. Cl. .................. 370/390; 370/389; 370/392
(58) Field of Classification Search ............... 370/390, 370/389, 392
See application file for complete search history.

(56) References Cited

U.S. PATENT DOCUMENTS

| | | | |
|---|---|---|---|
| 4,615,001 A | | 9/1986 | Hudgins, Jr. |
| 5,317,720 A | | 5/1994 | Stamm et al. |
| 5,892,766 A | * | 4/1999 | Wicki et al. ............... 370/412 |
| 5,898,687 A | * | 4/1999 | Harriman et al. ........... 370/390 |
| 5,970,072 A | * | 10/1999 | Gammenthaler et al. .... 370/537 |
| 6,160,809 A | * | 12/2000 | Adiletta et al. ............. 370/392 |
| 6,272,134 B1 | * | 8/2001 | Bass et al. .................. 370/390 |
| 6,333,902 B1 | * | 12/2001 | Shim ....................... 369/47.54 |
| 6,345,352 B1 | | 2/2002 | James et al. |
| 6,493,776 B1 | | 12/2002 | Courtright et al. |
| 6,496,520 B1 | | 12/2002 | Acosta |
| 6,724,761 B1 | * | 4/2004 | Moy-Yee et al. ............. 370/390 |
| 6,996,654 B2 | * | 2/2006 | Adkisson et al. ............ 710/306 |
| 7,050,455 B2 | * | 5/2006 | Nishihara ................... 370/466 |
| 7,154,916 B2 | * | 12/2006 | Soloff ....................... 370/528 |
| 2002/0019903 A1 | | 2/2002 | Lin |
| 2003/0079073 A1 | | 4/2003 | Richard et al. |
| 2003/0095561 A1 | * | 5/2003 | Hwang ....................... 370/432 |
| 2004/0202148 A1 | * | 10/2004 | Kuehnel ..................... 370/352 |
| 2004/0213284 A1 | * | 10/2004 | Clarke et al. ............... 370/465 |

FOREIGN PATENT DOCUMENTS

| | | |
|---|---|---|
| EP | 0201252 | 5/1985 |
| EP | 0583965 | 8/1992 |
| EP | 1089500 | 4/2001 |
| EP | 1128612 | 8/2001 |
| JP | 11-252137 A | 9/1999 |

OTHER PUBLICATIONS

Affidavit of Richard W. Adkisson, Feb. 17, 2005, 4 pages.

* cited by examiner

Primary Examiner—Rafael Pérez-Gutiérrez
Assistant Examiner—Allahyar Kasraian

(57) ABSTRACT

Systems and methods insert broadcast transactions into a fast data stream of transactions. Header packets of transactions of one or more fast data streams are processed into a single fast data stream. Header packets of one of the transactions are generated if the one transaction is a broadcast transaction. Data packets of the transactions of the fast data streams are processed into the single fast data stream such that data packets associated with the one transaction are generated in accordance with a header packet of the one transaction.

12 Claims, 6 Drawing Sheets

SYSTEMS AND METHODS TO INSERT BROADCAST TRANSACTIONS INTO A FAST DATA STREAM OF TRANSACTIONS

RELATED APPLICATIONS

This application is related to the following commonly owned and co-filed U.S. patent applications, filed May 9, 2003 and incorporated herein by reference: SYSTEMS AND METHODS FOR GENERATING TRANSACTION IDENTIFIERS having Ser. No. 10/434,657; SYSTEMS AND METHODS FOR DELETING TRANSACTIONS FROM MULTIPLE FAST DATA STREAMS having Ser. No. 10/434,637; SYSTEMS AND METHODS FOR COMBINING A SLOW DATA STREAM AND A FAST DATA STREAM INTO A SINGLE FAST DATA STREAM having Ser. No. 10/434,656; and SYSTEMS AND METHODS FOR INCREASING TRANSACTION ENTRIES IN A HARDWARE QUEUE having Ser. No. 10/434,655.

BACKGROUND

In a high speed server consisting of multiple processors, a core electronics complex, also known as a "chipset," provides communications between processors and various support devices (e.g., random access memory and disk drives etc.). The support devices communicate with the chipset using a plurality of fast data streams over one or more busses. Information in the data streams is contained in transactions constructed from one header packet and zero, one or more data packets.

The chipset operates to combine the fast data streams into a single fast data stream. As the chipset processes transactions of the fast data streams, it may determine that a transaction is to be broadcast to multiple destinations, and repeatedly broadcast the transaction within the single fast data stream. The repeated broadcast of the transaction must be done without corrupting or significantly delaying other transactions.

The repeated broadcast of a transaction is difficult, in part because the chipset receives transactions from two or more fast data streams simultaneously and interleaves header and data packets. Since the relative ordering of data packets within a transaction must be maintained, the repeated transaction broadcast cannot affect ordering of the interleaved transactions; the data packets of each repeated transaction broadcast must also be contiguous.

Prior art solutions typically repeat header and data packets for broadcast transactions without regard to how such action affects in-progress transactions. These solutions can compromise steady-state processing of input data streams and the relative ordering of neighboring transactions. Such solutions also utilize complicated logic and are expensive to implement.

SUMMARY OF THE INVENTION

In various embodiments, a method inserts broadcast transactions into a fast data stream of transactions. Header packets of transactions of one or more fast data streams are processed into a single fast data stream. Header packets of one of the transactions are generated if the one transaction is a broadcast transaction. Data packets of the transactions of the fast data streams are processed into the single fast data stream such that data packets associated with the one transaction are generated according to a header packet of the one transaction.

One system inserts broadcast transactions into a fast data stream of transactions. A header processor processes header packets of transactions from one or more fast data streams into a single fast data stream. The header processor is operable to determine if one of the transactions is a broadcast transaction and to generate a header packet of the one transaction. A data processor is responsive to the header processor to process data packets of the transactions into the single fast data stream, such that data packets associated with the one transaction are generated by the data processor.

In one embodiment, a system inserts broadcast transactions into a fast data stream of transactions, and includes: means for processing header packets of transactions of one or more fast data streams into a single fast data stream; means for generating header packets of one of the transactions if the one transaction is a broadcast transaction; and means for processing data packets of the transactions of the fast data streams into the single fast data stream, wherein data packets associated with the one transaction are in accordance with a header packet of the one transaction.

DETAILED DESCRIPTION OF THE FIGURES

Figure 1:
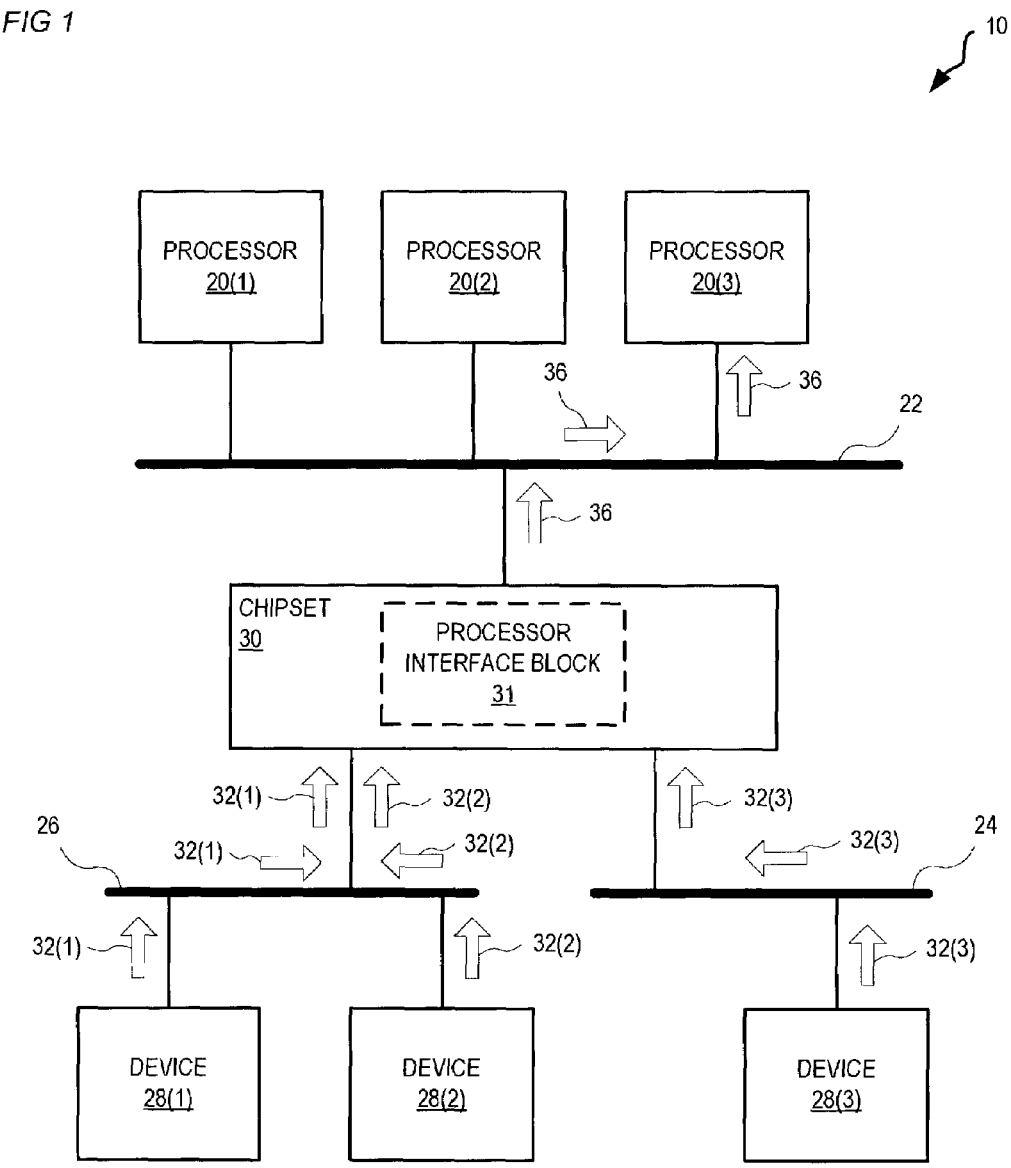
FIG. 1 is a block diagram showing one system for inserting broadcast transactions into a fast data stream of transactions.

FIG. 1 is a block diagram showing one system 10 that inserts broadcast transactions into a fast data stream of transactions. System 10 combines three fast data streams, 32(1), 32(2) and 32(3) to form a single fast data stream 36, and is illustratively shown with three processors 20(1), 20(2) and 20(3) connected to a processor bus 22, two high speed devices 28(1) and 28(2) connected to a first high speed bus 26, and a third high speed device 28(3) connected to a second high speed bus 24. Data streams 32 and 36 represent data communications from devices 28 to processors 20 over buses 22, 24 and 26. A chipset 30 has a processor interface block ("PIB") 31 that connects to processor bus 22, high speed buses 26 and 24, and operates to facilitate data communication between devices 28 and processors 20.

By way of example, high speed device 28(1) communicates data to PIB 31 in data stream 32(1) over high speed bus 26. High speed device 28(2) communicates data to PIB 31 in data stream 32(2) over high speed bus 26. High speed device 28(3) communicates data to PIB 31 in data stream 32(3) over high speed bus 24. PIB 31 communicates data from devices 28 to processor 20(3) in single fast data stream 36 over processor bus 22. High speed devices 28(1), 28(2) and 28(3) are, for example, random access memory, disk drives and graphical interfaces.

Additional data streams may exist within system 10, for example to facilitate data communication from processors 20 to devices 28 over busses 22, 24 and 26. FIG. 1 shows only four data streams 32(1), 32(2), 32(3) and 36 for clarity of illustration.

Figure 2:
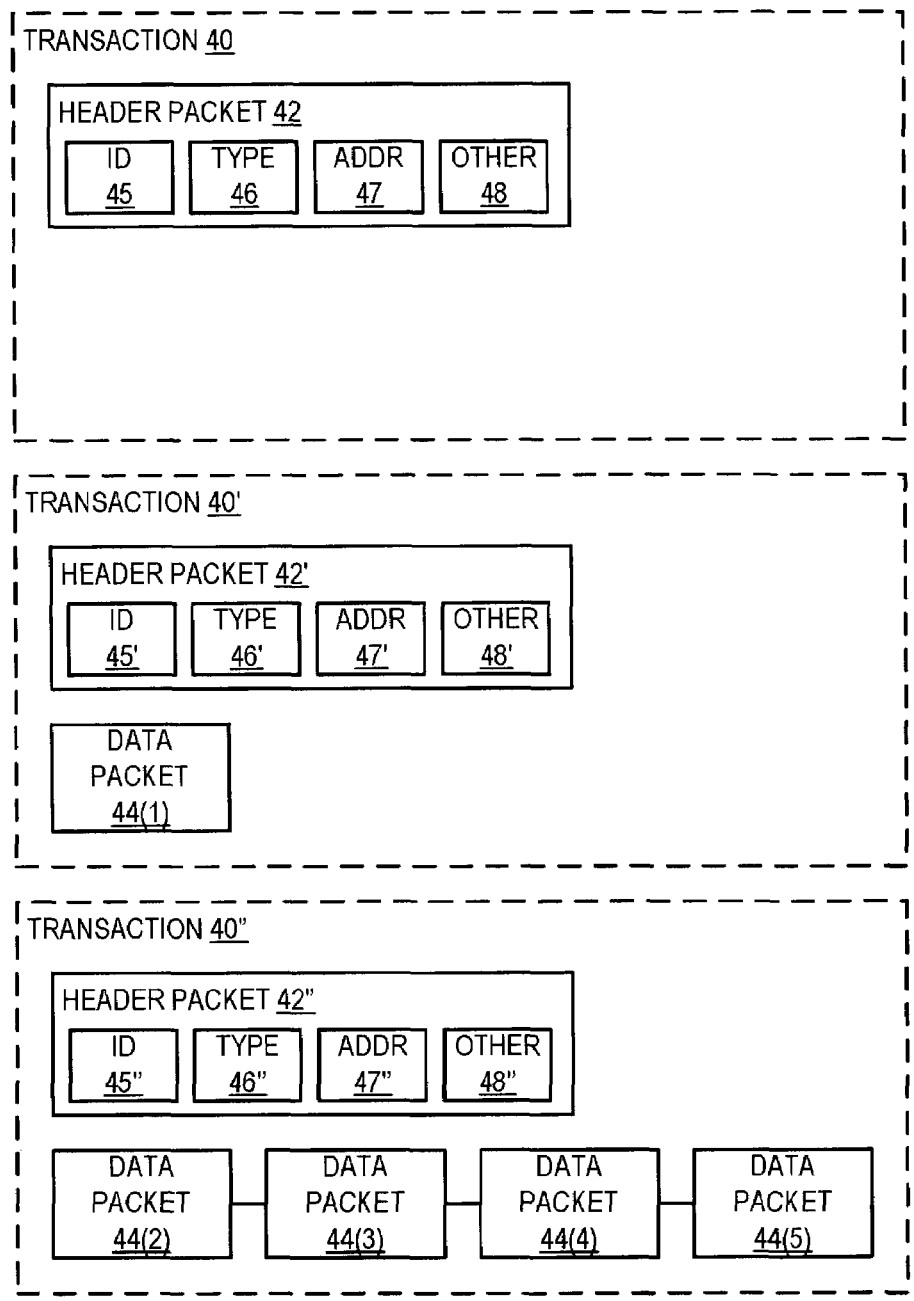
FIG. 2 is a block diagram illustrating three exemplary transactions constructed from header packets and data packets.

A transaction is a data structure that contains information transferred within data streams 32 and 36. Each transaction has a header packet and, optionally, one or more data packets, as illustrated in FIG. 2. In particular, FIG. 2 shows a block diagram of three exemplary transactions 40 used to transfer information within data streams 32(1), 32(2), 32(3) and 36. Transaction 40 has a header packet 42 and zero data packets. Transaction 40' has a header packet 42' and one data packet 44(1). Transaction 40" has a header packet 42" and four data packets 44(2), 44(3), 44(4) and 44(5). Header packets 42, 42' and 42" may each respectively contain a transaction ID 45, a transaction type 46, an address 47, and additional information 48, as illustrated. Transaction ID 45 is a unique identifier, used by system 10 to identify transaction 40. Transaction type 46 indicates the type of information and the number of data packets that are included in transaction 40. Address 47 defines a location in memory if transaction 40 is a data transfer. For example, if device 28(1) is a device containing random access memory, address 47 may define a location within the random access memory. Additional information 48 in header packet 42 may include, for example, error codes that operate to verify that information has been transferred without corruption.

Transactions 40, 40' and 40" are given as examples of transactions. Transactions may consist of other combinations of header and data packets without departing from the scope hereof.

Figure 3:
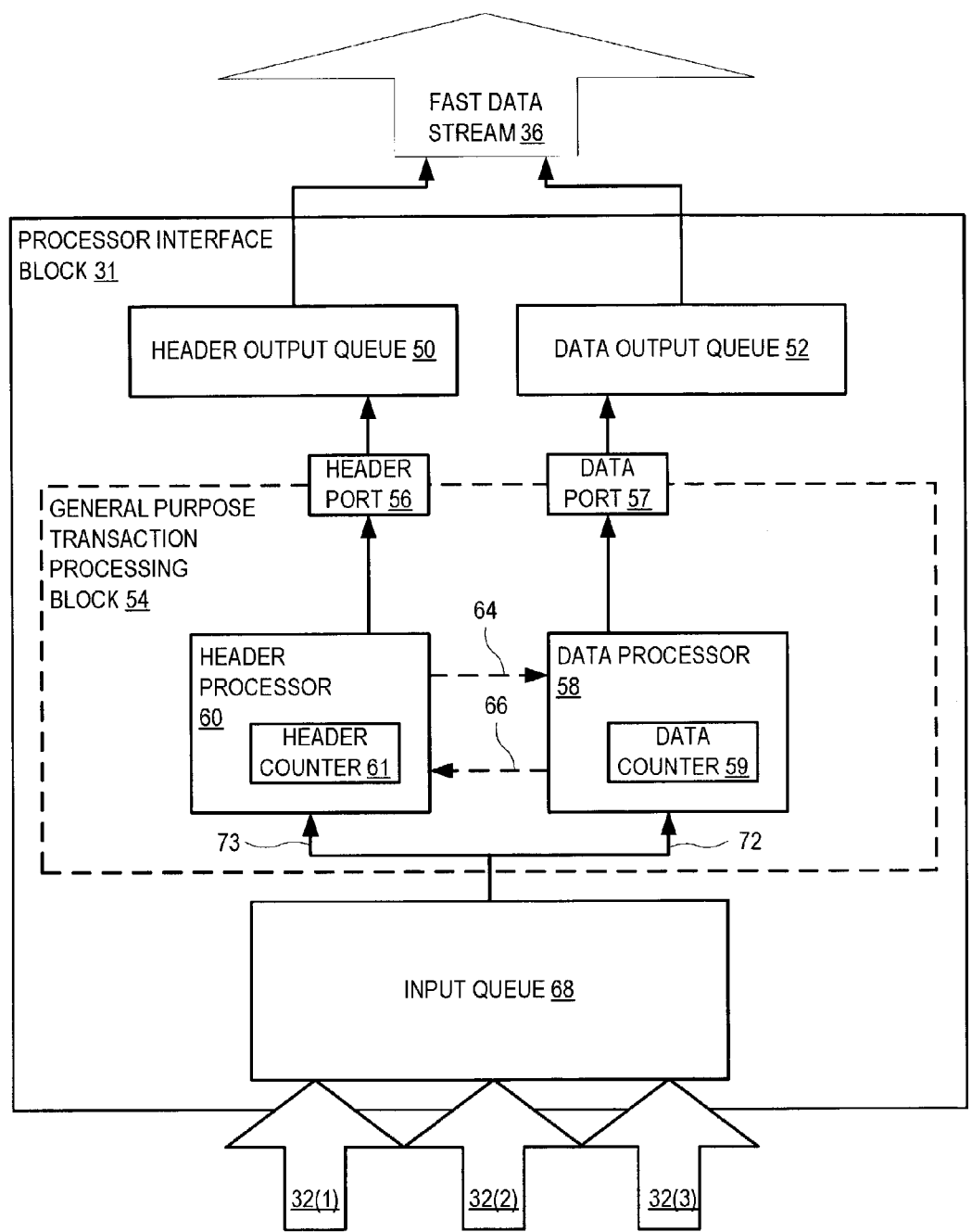
FIG. 3 is a block schematic diagram showing exemplary detail of the processor interface block of FIG. 1.

An exemplary embodiment of PIB 31, FIG. 1, is shown in FIG. 3, illustrating data communication from devices 28 to processor 20(3). As shown, PIB 31 combines fast data streams 32 into single fast data stream 36. PIB 31 is illustratively shown with a general purpose transaction processing block 54, which includes a header processor 60 and a data processor 58. Header processor 60 and data processor 58 operate according to control signals 64, 66 between one another to process header packet 42 and data packets 44, respectively. This controlled operation reduces latency and maximizes bandwidth associated with processing transactions 40 within PIB 31, thereby improving performance of system 10.

PIB 31 also includes an input queue 68 that stores transactions 40 received from fast data streams 32(1), 32(2) and 32(3). Input queue 68 is, for example, a latch array within PIB 31. Input queue 68 is monitored by data processor 58, via a data path 72, to determine the packet type (header packet 42 or data packet 44) at the front of input queue 68. If, for example, header packet 42 is at the front of input queue 68, data processor 58 informs header processor 60, through control signal 66, to read header packet 42 from input queue 68; header processor 60 in turn reads the header packet of input queue 68 over data path 73. If, on the other hand, data packet 44 is at the front of input queue 68, data processor 58 reads data packet 44 from input queue 68 over data path 72.

In one embodiment, header processor 60 reformats header packet 42 to match the format of fast data stream 36, if necessary, and sends header packet 42 to a header output queue 50 via a header port 56. Header output queue 50 is, for example, a latch array within PIB 31. Header port 56 is an interface between general purpose transaction processing block 54 and header output queue 50; it may include ratio logic to facilitate transferring data from one clock frequency domain to another (e.g., from within block 54 to outside block 54). Header output queue 50 stores header packets 42 prior to output to single fast data stream 36 (i.e., over bus 22, FIG. 1).

In one embodiment, data processor 58 reformats data packets 44 to the format of fast data stream 36, if necessary, and sends data packets 44 to a data output queue 52 via a data port 57. Data output queue 52 is, for example, a latch array within PIB 31. Data port 57 is an interface between general purpose transaction processing block 54 and data output queue 52; it may include ratio logic to facilitate transferring data from one clock frequency domain to another (e.g., from within block 54 to outside block 54). Data output queue 52 stores data packets 44 prior to output to single fast data stream 36. Fast data stream 36 conveys the combined header and data packets to processor 20 over bus 22 of FIG. 1.

Communication within FIG. 3 may also occur in reverse order, from processors 20 to devices 28. Accordingly, PIB 31 may also include functionality that facilitates such reverse data communication; however such functionality is not shown for clarity. Moreover, those skilled in the art appreciate devices 28, FIG. 1, also typically include interface blocks to process transactions to and from PIB 31.

Header processor 60 uses transaction type 46, within each header packet 42 of transaction 40, to determine if a particular transaction 40 should be broadcast to multiple destinations. A broadcast transaction is a transaction that is delivered to a plurality of destinations connected to processor bus 22 (e.g., to processors 20(1), 20(2) and 20(3)). The broadcast transaction is repeatedly output to fast data stream 36 such that one version is sent to each destination. As described in more detail below, header processor 60 and data processor 58 cooperate to insert such broadcast transactions into single fast data stream 36. Header processor 60 includes a header counter 61 that counts header packets 42 for the broadcast transactions. Data processor 58 includes a data counter 59 that counts data packets 44 for the broadcast transactions.

Figure 4:
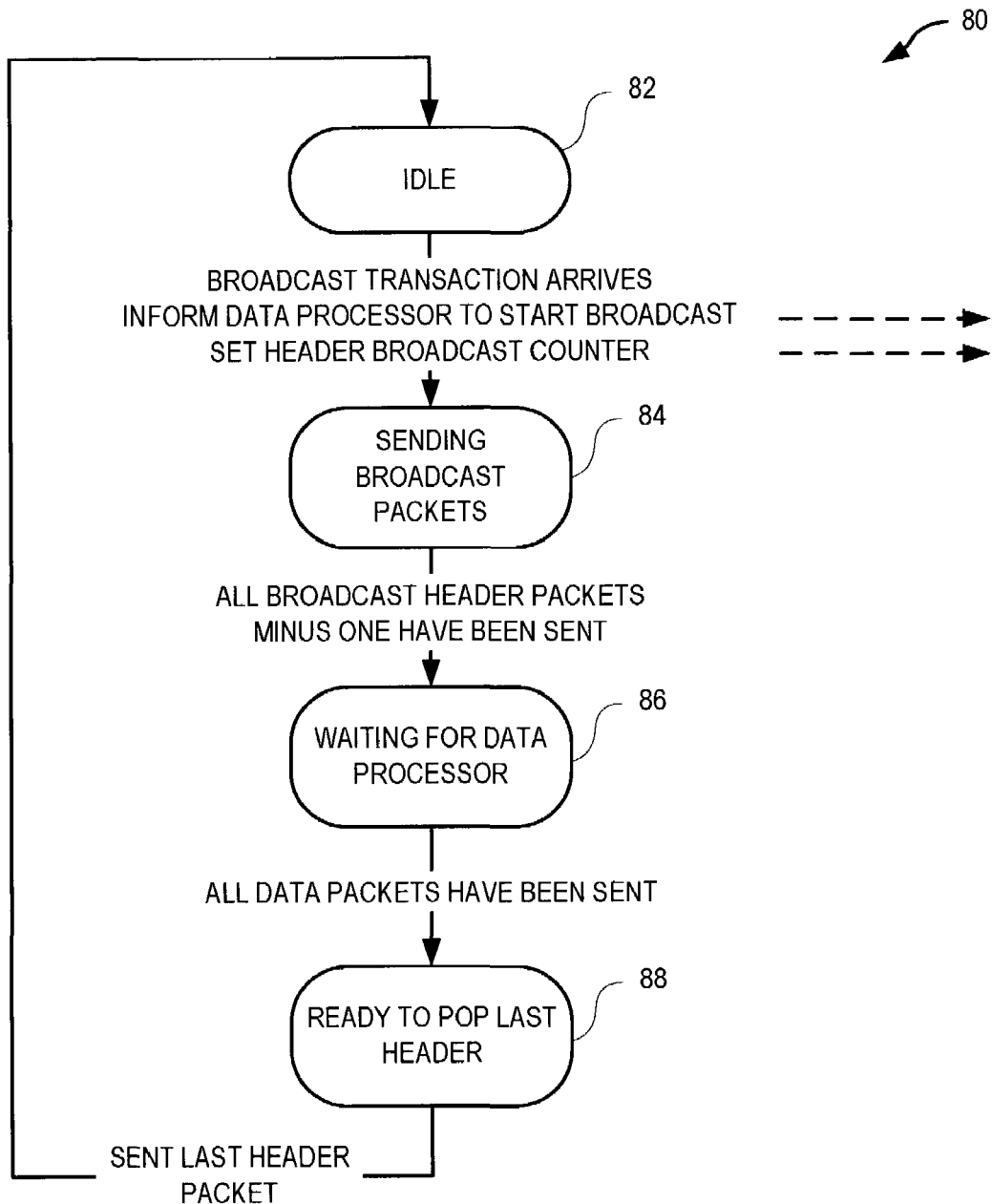
FIG. 4 is a diagram showing exemplary state machine logic that handles insertion of broadcast transactions into a fast data stream of transactions.
Figure 5:
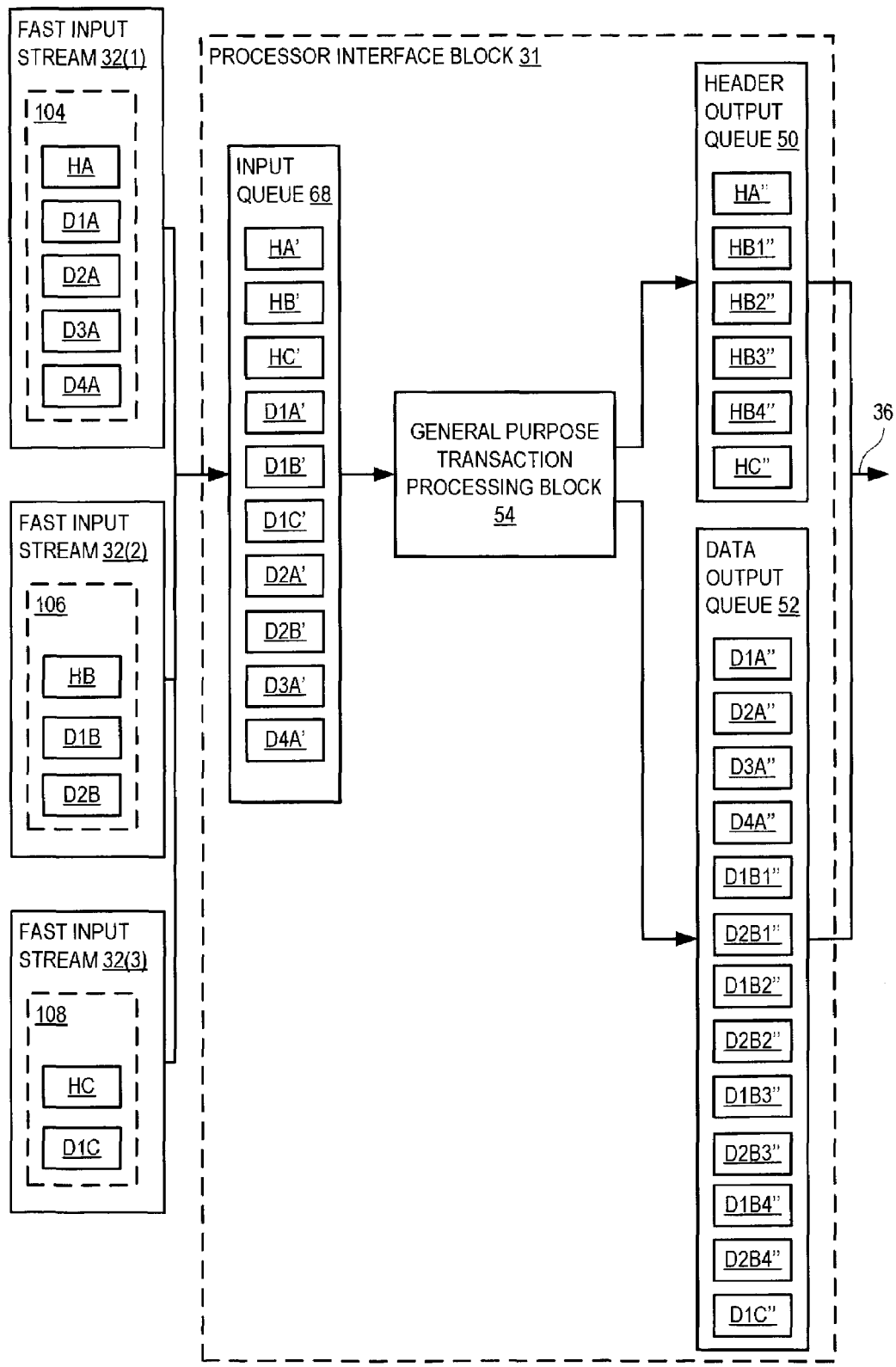
FIG. 5 is a block schematic diagram illustrating exemplary data processed with the state machine logic of FIG. 4.

FIG. 4 is a diagram illustrating exemplary state machine logic 80 used within header processor 60, FIG. 3. FIG. 5 is a block diagram illustrating exemplary data used within state machine logic 80. In an illustrative example, fast data stream 32(1) has one transaction 104 constructed of one header packet HA and four data packets D1A, D2A, D3A and D4A; fast data stream 32(2) has one transaction 106 constructed of one header packet HB and two data packets D1B and D2B; and fast data stream 32(3) has one transaction 108 constructed of one header packet HC and one data packet D1C. In the example, transactions 104, 106 and 108 arrive at input queue 68 concurrently; therefore individual packets of transactions 104, 106 and 108 become interleaved and stored as header packets HA', HB', HC' and data packets D1A', D1B', D1C', D2A', D2B', D3A' and D4A' in input queue 68, as shown in FIG. 5. In the example, transaction 106 is a broadcast transaction; its header packet HB has a transaction type 46 data field identifying four destinations for transaction 106. Alternatively, transaction type 46 may specify transaction 106 as a transaction to be delivered to all processors 20; in this alternative embodiment, PIB 31 is aware of the number of processors 20 on bus 22 and outputs one version of transaction 106 to each processor 20.

In illustrative operation, data processor 58 instructs header processor 60 (via control signal 66) to process header packets HA', HB' and HC' from input queue 68. Header processor 60 sends processed header packet HA", HB1", HB2", HB3", HB4" and HC" to header output queue 50, as shown; in doing so, header counter 61 of header processor 60 is used to generate three extra versions of HB (i.e., HB2", HB3", HB4') for header output queue 50. Header processor 60 also instructs data processor 58, via control signal 64, to repeat data packets D1B and D2B four times. Data processor 58 processes data packets D1A', D1B', D2A', D2B', D3A' and D1C' from input queue 68 and sends processed data packets D1A", D2A", D3A", D4A", D1B1", D2B1", D1B2", D2B2", D1B3", D2B3", D1B4", D2B4" and D1C" to data output queue 52; in doing so, data counter 59 of data processor 58 is used to generate three extra versions of D1B, D2B (i.e., D1B2", D2B2", D1B3", D2B3", D1B4", D2B4') for data output queue 52.

In the foregoing example, it should be apparent that processing and repeated generation of header and data packets may include reformatting of the header and data packets, such as to accommodate changes in transaction packet formats between fast data streams 32 and fast data stream 36. The use of the words "process" and "generate" should not be considered limiting but rather are illustrative of operation.

The processing time for individual header and data packets may differ; and the order in which header packets HA" HB1", HB2", HB3", HB4" and HC" are sent to single fast output data stream 36, relative to data packets D1A", D2A", D3A", D4A", D1B1", D2B1", D1B2", D2B2", D1B3", D2B3", D1B4", D2B4" and D1C", may be indeterminate. However, if header packet HA' is received by PIB 31 before header packet HB', header packet HA" is sent to header output queue 50 prior to header packet HB1". Likewise, data packets D1A", D2A", D3A", D4A", D1B1", D2B1", D1B2", D2B2", D1B3", D2B3", D1B4", D2B4" and D1C" are sent to data output queue 52 in the order in which they are received.

State machine logic 80, FIG. 4, thus illustrates an exemplary communication protocol between header processor 60 and data processor 58 to insert broadcast transaction 106 to single fast data stream 36, FIG. 3. Header processor 60 transitions to an idle state 82 after processing a header packet from data streams 32.

In one example, header processor 60 transitions to idle state 82 after processing header packet HA'. Data processor 58 instructs header processor 60, via control signal 66, to read header packet HB' from input queue 68. Header processor 60 analyzes header packet HB' and determines that transaction 106 of fast data stream 32(2) is a broadcast transaction with four destinations. Header processor 60 informs data processor 58, via control signal 64, to broadcast data packets from transaction 106 four times. Header processor 60 sets header counter 61 to three and then transitions from idle state 82 to a sending broadcast packets state 84. Header processor 60 outputs all except the last header packet of the broadcast (i.e., in the example, header processor 60 outputs HB1", HB2" and HB3" to header output queue 50) and then transitions to a ready to POP last header state 86.

Data processor 58 receives instruction from header processor 60, via control signal 64, identifying two packets, D1B and D2B, to be repeatedly output as a broadcast transaction. Data processor 58 completes processing of data packets D1A, D2A, D3A and D4A of transaction 104 before processing data packets D1B and D2B of data stream 32(2). Data processor 58 then sets data counter 59 to four and outputs data packets D1B' and D2B', four times to data output queue 52, as D1B1", D2B1", D1B2", D2B2", D1B3", D2B3", D1B4" and D2B4". Data processor 58 then notifies header processor 60, via control signal 66, that it has completed the multiple broadcast data packets, and then resumes processing of data packet D1C' of input queue 68.

In one embodiment, new transactions arriving at input queue 68, FIG. 3, during data processor state 86 are not processed by data processor 58 until completion the broadcast transaction.

Upon receipt of the notification from data processor 58, header processor 60 transitions to a ready to POP last header state 88 where it outputs the final header packet HB4" of the broadcast transaction to header output queue 50. Header processor 60 then transitions to idle state 82 where it begins processing of HC' from input queue 68 or from an overflow register in header processor 60.

In one embodiment, transactions 104, 106 and 108 from fast data streams 32(1), 32(2) and 32(3), respectively, are processed by header processor 60 and data processor 58 such that ordering of header packets HA', HB' and HC' and data packets D1A', D2A', D3A', D4A', D1B', D2B and D1C' conform to round robin arbitration.

Figure 6:
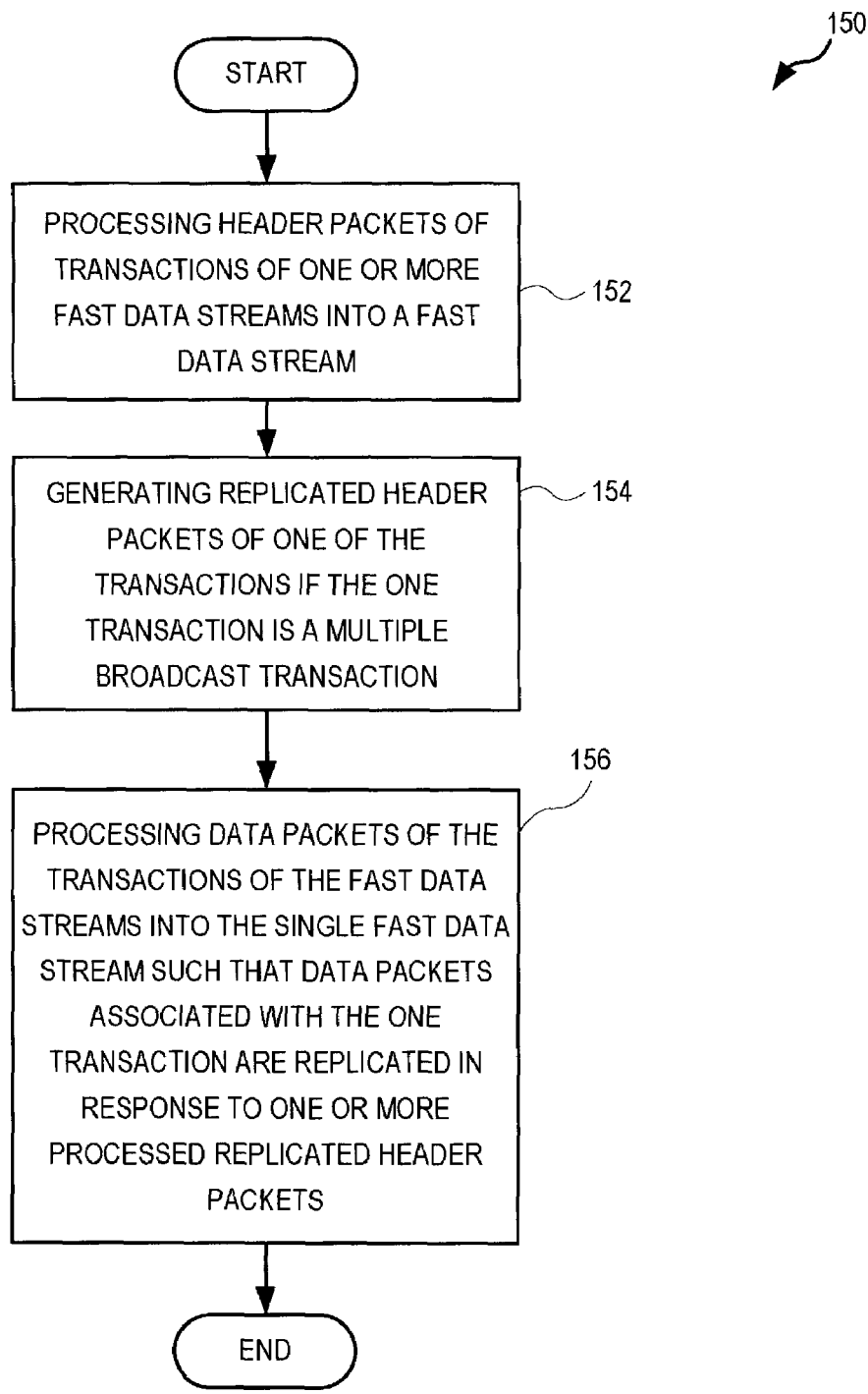
FIG. 6 is a flowchart illustrating one process for inserting broadcast transactions into a fast data stream of transactions.

FIG. 6 is a flowchart illustrating one process 150 for inserting broadcast transactions into a fast data stream of transactions. In step 152, header processor 60 processes header packets of transactions of one or more fast data streams (e.g., data streams 32, FIG. 1) into a fast data stream (e.g., data stream 36, FIG. 1). In step 154, header processor 60 generates header packets of one of the transactions if the one transaction is a broadcast transaction. In step 156, data processor 58 processes data packets of the transactions of the fast data streams into the fast data stream such that data packets associated with the one transaction are generated in response to one or more generated header packets.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for inserting broadcast transactions into a fast data stream of transactions, comprising:
    processing header packets of transactions of two or more fast data streams into a single fast data stream of a processor bus;
    generating header packets of one of the transactions if the one transaction is a broadcast transaction, the step of generating comprising utilizing a counter to count a number of generated header packets to determine completion of the step of generating; and
    processing data packets of the transactions of the fast data streams into the single fast data stream such that data packets associated with the one transaction are generated in accordance with a header packet of the one transaction;
    the header packets being output to the fast data stream in the order in which they are received and the data packets being output to the fast data stream in the order in which they are received.

2. The method of claim 1, further comprising determining whether the one transaction is the broadcast transaction, the step of processing responsive to the step of determining to generate the data packets of the one transaction.

3. The method of claim 2, further comprising reading a transaction type data field of the header packet to determine whether the one transaction is the broadcast transaction.

4. The method of claim 2, further comprising signaling a data processor to generate the data packets according to information specified within the header packet after determining that the one transaction is the broadcast transaction.

5. The method of claim 4, further comprising signaling a header processor after generating the data packets.

6. The method of claim 1, the step of processing comprising utilizing a counter to count a number of generated data packets to determine completion of the step of processing.

7. A system that inserts broadcast transactions into a fast data stream of transactions, comprising:

a header processor for processing header packets of transactions from two or more fast data streams into a single fast data stream of a processor bus, the header processor operable to determine if one of the transactions is a broadcast transaction and to generate a header packet of the one transaction; and a data processor responsive to the header processor for processing data packets of the transactions into the single fast data stream such that data packets associated with the one transaction are generated in the single fast data stream;

the header packets being output to the fast data stream in the order in which they are received and the data packets being output to the fast data stream in the order in which they are received, the data processor signaling the header processor, after generating the data packets associated with the one transaction, to process subsequent header packets of the one or more fast data streams.

8. The system of claim 7, the header processor signaling the data processor, after reading a header packet of the one transaction, to generate data packets associated with the one transaction.

9. A system that inserts broadcast transactions into a fast data stream of transactions, comprising:

means for processing header packets of transactions of two or more fast data streams into a single fast data stream of a processor bus;

means for generating header packets of one of the transactions if the one transaction is a broadcast transaction;

means for processing data packets of the transactions of the fast data streams into the single fast data stream, wherein data packets associated with the one transaction are in accordance with a header packet of the one transaction;

the header packets being output to the fast data stream in the order in which they are received and the data packets being output to the fast data stream in the order in which they are received;

means for counting a number of generated header packets associated with the one transaction; and means for counting a number of generated data packets associated with the one transaction.

10. The system of claim 9, further comprising means for determining whether the one transaction is the broadcast transaction.

11. The system of claim 10, further comprising means for reading a header packet of the one transaction.

12. The system of claim 10, the means for processing responsive to the means for generating to generate the data packets associated with the one transaction.

* * * * *